(12) United States Patent
Boussemart et al.

(10) Patent No.: US 8,733,234 B2
(45) Date of Patent: May 27, 2014

(54) APPLIANCE FOR CONDITIONING A MILK-BASED LIQUID

(75) Inventors: Christophe S. Boussemart, Lugrin (FR); Alexa Perrin, Pully (CH)

(73) Assignee: Nestec S.A., Vevey (CH)

( * ) Notice: Subject to any disclaimer, the term of this patent is extended or adjusted under 35 U.S.C. 154(b) by 559 days.

(21) Appl. No.: 13/059,368

(22) PCT Filed: Aug. 31, 2009

(86) PCT No.: PCT/EP2009/061209
§ 371 (c)(1),
(2), (4) Date: Feb. 16, 2011

(87) PCT Pub. No.: WO2010/023312
PCT Pub. Date: Mar. 4, 2010

(65) Prior Publication Data
US 2011/0146500 A1      Jun. 23, 2011

(30) Foreign Application Priority Data

Sep. 1, 2008   (EP) .................................... 08163427

(51) Int. Cl.
*A23F 3/00*     (2006.01)
*A47J 31/44*    (2006.01)
*A47J 43/07*    (2006.01)

(52) U.S. Cl.
CPC .......... *A47J 31/4489* (2013.01); *A47J 43/0716* (2013.01)
USPC ...................................................... 99/323.1

(58) Field of Classification Search
CPC ... A47J 31/4489; A47J 43/0716; A01J 11/04; B01F 3/04

USPC ............ 99/323.1, 294, 453, 287, 281, 277.2; 366/148
See application file for complete search history.

(56) References Cited

U.S. PATENT DOCUMENTS

| | | | |
|---|---|---|---|
| 2,932,493 A | 4/1960 | Jacobs | ........................... 259/102 |
| 3,182,975 A | 5/1965 | Stewart, Jr. | ..................... 261/34 |

(Continued)

FOREIGN PATENT DOCUMENTS

| | | |
|---|---|---|
| DE | 1 131 372 | 6/1962 |
| DE | 1 554 670 | 2/1970 |

(Continued)

OTHER PUBLICATIONS

International Search Report and Written Opinion, application No. PCT/EP2009/061209, mailed Oct. 19, 2009.

(Continued)

*Primary Examiner* — Dana Ross
*Assistant Examiner* — Renee L Miller
(74) *Attorney, Agent, or Firm* — Winston & Strawn LLP

(57) ABSTRACT

An appliance is arranged for frothing a body of a milk-containing liquid contained in a frothing tank. Such appliance includes an air incorporation device that is arranged to dip or to be immersed in such body of liquid during frothing for incorporating air thereinto; and a steam supply arrangement having a steam outlet that is arranged to be immersed in such body of liquid during frothing for incorporating steam thereinto. The steam outlet and the air incorporation device are arranged to be at spaced apart locations in such body of liquid during frothing so as to form steam bubbles at the steam outlet separately from air bubbles that are being formed by the air incorporation device.

20 Claims, 4 Drawing Sheets

(56) References Cited

U.S. PATENT DOCUMENTS

| | | |
|---|---|---|
| 3,356,349 A | 12/1967 | Keppler .................. 259/111 |
| 4,162,855 A | 7/1979 | Bender .................. 366/274 |
| 4,479,908 A | 10/1984 | Arbeillé et al. .............. 261/62 |
| 4,537,332 A | 8/1985 | Brown et al. .............. 222/190 |
| 5,133,247 A | 7/1992 | Pastrick .................. 99/295 |
| 5,265,519 A | 11/1993 | Schiettecatte et al. ......... 99/293 |
| 5,295,431 A | 3/1994 | Schiettecatte et al. ......... 99/293 |
| 5,473,972 A | 12/1995 | Rizzuto et al. .............. 99/290 |
| 5,638,740 A | 6/1997 | Cai .................. 99/295 |
| 6,006,654 A | 12/1999 | Pugh .................. 99/293 |
| 6,318,247 B1 | 11/2001 | Di Nunzio et al. .......... 99/348 |
| 6,712,497 B2 | 3/2004 | Jersey et al. .............. 366/274 |
| 7,021,206 B2 | 4/2006 | Eckenhausen et al. ........ 99/452 |
| 7,314,307 B2 | 1/2008 | Cai .................. 366/273 |
| 7,322,282 B2 | 1/2008 | Frigeri .................. 99/453 |
| 7,461,586 B2 * | 12/2008 | Garman et al. .............. 99/307 |
| 2001/0036124 A1 | 11/2001 | Rubenstein .............. 366/205 |
| 2002/0134248 A1 | 9/2002 | Eugster .................. 99/275 |
| 2003/0106433 A1 | 6/2003 | Oldani et al. .............. 99/279 |
| 2004/0107843 A1 | 6/2004 | Oldani et al. .............. 99/452 |
| 2005/0115419 A1 | 6/2005 | Oldani et al. .............. 99/453 |
| 2006/0018187 A1 | 1/2006 | Donna et al. .............. 366/129 |
| 2007/0221068 A1 * | 9/2007 | Boussemart et al. ........ 99/279 |
| 2008/0168907 A1 | 7/2008 | Shen et al. .............. 99/294 |
| 2009/0101021 A1 * | 4/2009 | Tonelli et al. .............. 99/290 |

FOREIGN PATENT DOCUMENTS

| | | |
|---|---|---|
| DE | 89 15 094 U1 | 3/1990 |
| DE | 40 37 366 A1 | 5/1992 |
| DE | 44 45 436 A1 | 6/1996 |
| DE | 195 45 111 A1 | 6/1997 |
| DE | 196 11 450 C1 | 7/1997 |
| DE | 196 24 648 A1 | 1/1998 |
| DE | 197 19 784 C1 | 7/1998 |
| DE | 10 2004 063 285 A1 | 7/2006 |
| DE | 20 2007 009 537 U1 | 10/2007 |
| DE | 10 2006 031 064 B3 | 1/2008 |
| EP | 0 344 859 A1 | 12/1989 |
| EP | 0 480 928 B1 | 4/1992 |
| EP | 0 607 759 A1 | 7/1994 |
| EP | 0 791 321 A1 | 8/1997 |
| EP | 0 813 834 A1 | 12/1997 |
| EP | 0 858 757 A1 | 8/1998 |
| EP | 1 197 175 A1 | 4/2002 |
| EP | 1 223 839 B1 | 7/2002 |
| EP | 1 501 398 B1 | 2/2005 |
| EP | 1 597 992 A1 | 11/2005 |
| EP | 1 656 862 A1 | 5/2006 |
| EP | 1 658 797 A2 | 5/2006 |
| EP | 1 716 796 A1 | 11/2006 |
| EP | 1 725 124 B1 | 11/2006 |
| EP | 1 731 065 A1 | 12/2006 |
| EP | 1 776 904 A1 | 4/2007 |
| EP | 1 776 905 A1 | 4/2007 |
| EP | 1 785 074 A1 | 5/2007 |
| EP | 1 827 188 B1 | 9/2007 |
| EP | 1 857 028 A1 | 11/2007 |
| EP | 1 878 370 A1 | 1/2008 |
| FR | 769 848 | 9/1934 |
| FR | 775 618 | 1/1935 |
| FR | 2 708 185 A3 | 2/1995 |
| WO | WO 90/10411 A1 | 9/1990 |
| WO | WO 96/22830 A1 | 8/1996 |
| WO | WO 01/26520 A2 | 4/2001 |
| WO | WO 01/88187 A1 | 11/2001 |
| WO | WO 01/97668 A1 | 12/2001 |
| WO | WO 03/003888 A1 | 1/2003 |
| WO | WO 2004/043213 A1 | 5/2004 |
| WO | WO 2006/050900 A1 | 5/2006 |
| WO | WO 2006/122916 A1 | 11/2006 |
| WO | WO 2007/095770 A1 | 8/2007 |
| WO | WO 2007/120038 A1 | 10/2007 |
| WO | WO 2007/144735 A2 | 12/2007 |
| WO | WO 2008/034708 A1 | 3/2008 |
| WO | WO 2008/046837 A1 | 4/2008 |
| WO | WO/2008/142154 A1 | 11/2008 |

OTHER PUBLICATIONS

International Search Report and Written Opinion, application No. PCT/EP2009/061212, mailed Jan. 19, 2010.

* cited by examiner

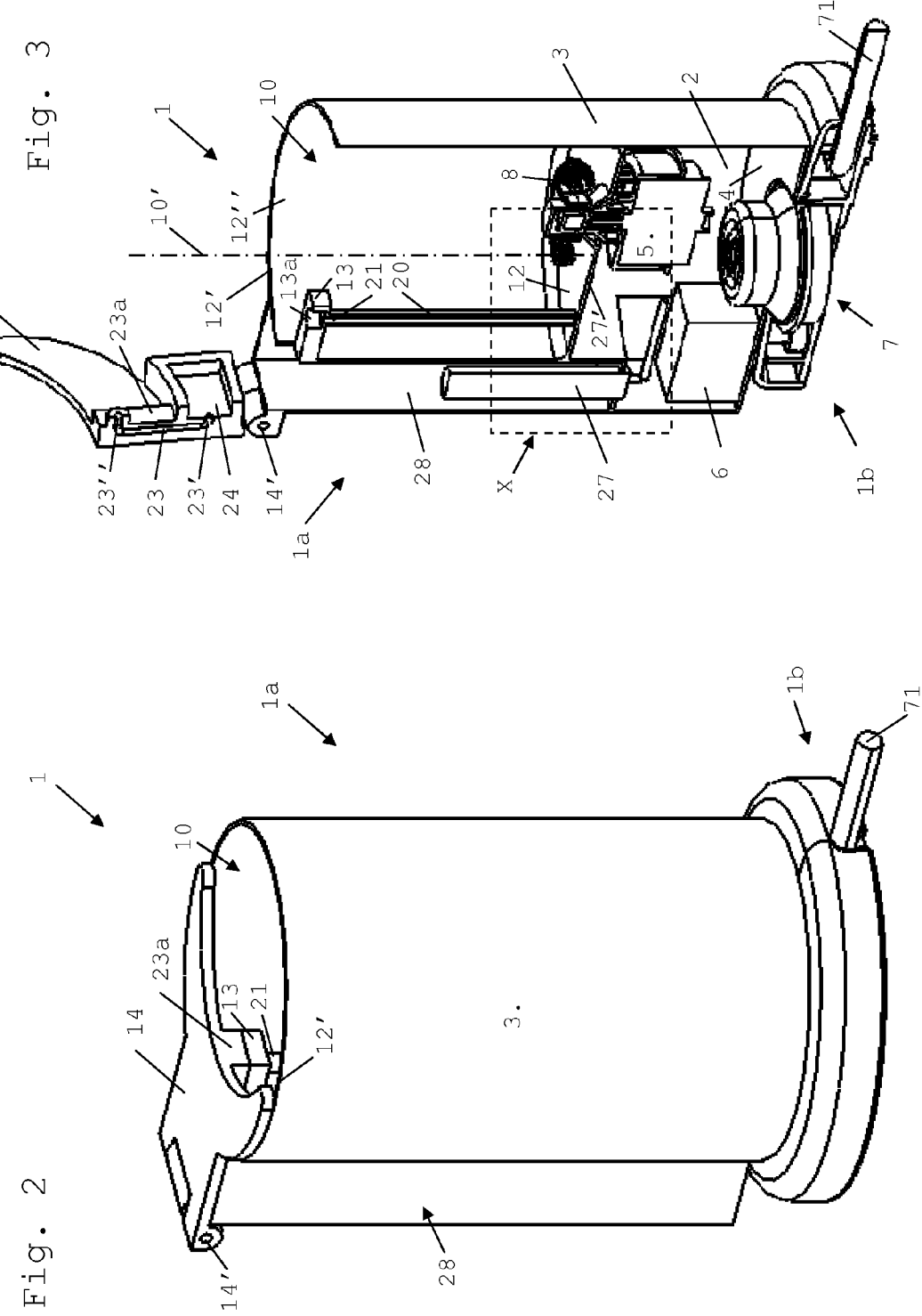

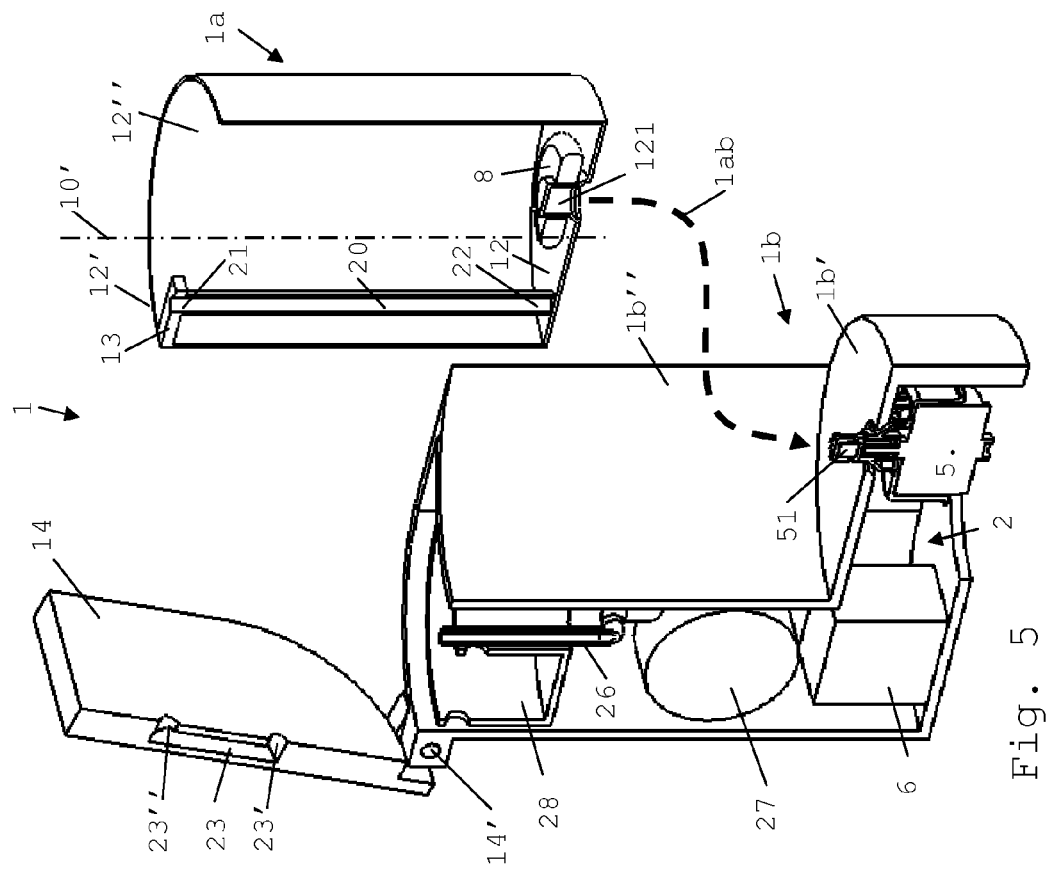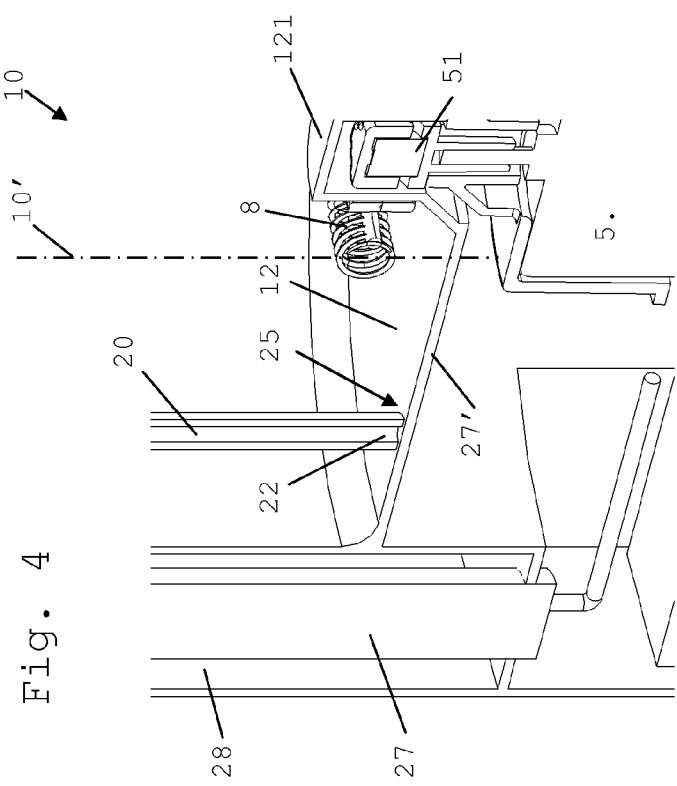

APPLIANCE FOR CONDITIONING A MILK-BASED LIQUID

This application is a 371 filing of International Patent Application PCT/EP2009/061209 filed Aug. 31, 2009.

FIELD OF THE INVENTION

The present invention relates to an appliance for frothing a milk-based liquid to be used, for example, in the context of the preparation of beverages such as cappuccinos, milky coffees, café latte and macchiato, chocolate and other hot beverages.

BACKGROUND ART

Speciality beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid.

Various systems are known to condition fresh milk. Such prior art systems are for example disclosed in DE 11 31 372, DE 15 54 670, DE 196 11 450, DE 196 24 648, DE 197 19 784, DE 40 37 366, DE 44 45 436, DE 89 15 094, DE 20 2007 009 537, DE 10 2004 063 285, DE 10 2006 031 064, EP 0 344 859, EP 0 480 928, EP 0 607 759, EP 0 791 321, EP 0 813 834, EP 0 858 757, EP 1 197 175, EP 1 223 839, EP 1 501 398, EP 1 597 992, EP 1 716 796, EP 1 725 124, EP 1 731 065, EP 1 776 904, EP 1 776 905, EP 1 785 074, EP 1 827 188, EP 1 857 028, EP 1 878 370, FR 769 848, FR 2 708 185, U.S. Pat. No. 2,932,493, U.S. Pat. No. 3,182,975, U.S. Pat. No. 3,356,349, U.S. Pat. No. 4,162,855, U.S. Pat. No. 4,537,332, U.S. Pat. No. 4,479,908, U.S. Pat. No. 5,133,247, U.S. Pat. No. 5,265,519, U.S. Pat. No. 5,295,431, U.S. Pat. No. 5,473,972, U.S. Pat. No. 6,006,654, U.S. Pat. No. 6,318,247, U.S. Pat. No. 6,712,497, U.S. Pat. No. 7,021,206, U.S. Pat. No. 7,322,282, US2002/0134248, WO 90/10411, WO 96/22830, WO 03/003888, WO 2004/043213, WO 2006/050900, WO 2006/122916, WO 2007/095770, WO 2007/120038, WO 2007/144735, WO 2008/034708, WO 2008/046837 and PCT/EP08/056349. Conditioning systems for other applications, such as tea, coffee, hot chocolate, soup, salad dressing, etc. . . . are disclosed in US 2001/0036124, US 2006/0018187 and U.S. Pat. No. 7,314,307.

The simplest method to froth milk consists in plunging a steam supply pipe into a cup of milk to be frothed. However, the results of such a method depend largely on the skills of the user and generally provide a poor froth quality. In fact, usually, milk ends up merely heated and not significantly frothed for lack of air incorporation into the milk during the conditioning treatment. Indeed, for achieving an acceptable frothing, the user is expected to skillfully move the steaming pipe in the milk so as to agitate it at the same time for simultaneous incorporation of air into the milk. Such systems are for instance disclosed in EP 0 791 321 and EP 1 716 796. The mere heating by vapour without frothing of milk is well known and may also be achieved automatically, for instance as disclosed in EP 1 776 904. In particular, a vapour source may be combined with a stirrer to avoid burning of milk on the steam injection duct by injecting the vapour into the milk via the stirrer enclosed in a stirring chamber in fluid communication with milk, as for instance disclosed in U.S. Pat. No. 3,182,975 and U.S. Pat. No. 4,479,908.

Milk may also be frothed by sucking fresh milk from a milk source into a device that includes an air inlet and a pressurised vapour inlet forming a Venturi arrangement, for heating and mixing such milk with vapour and air, and an outlet for the thereby frothed milk. Such devices are for example disclosed in the abovementioned EP 1 716 796, DE 10 2006 031 064 and DE 44 45 436. Such systems may also be combined with an in-line stirrer, as for example disclosed in DE 20 2007 009 537. Furthermore, in EP 1 785 074 milk is pumped from a reservoir into a mixing chamber into which a mixture or vapour and milk is injected for frothing the milk, and then the frothed milk is delivered to a delivery opening.

Another known approach involves the use of a frothing receptacle which comprises a frothing arrangement and into which milk is supplied and then frothed. The frothing may be carried out by injecting vapour and air with a Venturi arrangement into the milk contained in the receptacle, for instance as disclosed in EP 1 725 124, WO 01/26520 and WO 2006/122916. This system produces frothed milk with a relatively liquid foam having large bubbles.

A problem involved with the suction of milk in a Venturi-type vapour arrangement is the immediate condensation of vapour in the Venturi arrangement and the poor formation of vapour bubbles in the milk.

Frothing of milk in a tank can also be achieved by an impeller for mechanically agitating and driving air into the milk and a resistive heater for heating the milk at the same time, as for example disclosed in WO 2006/050900 and PCT/EP08/056349. This system produces a relatively dry firm foam with large bubbles as well.

There are frothing devices that combine a vapour supply pipe for heating and a mechanical stirrer extending therebelow for simultaneously agitating the milk in a cup held by a used under this frothing device. Such a stirrer may be connected via a drive shaft to a drive rotor that is located inside the vapour tube and that is driven by the passage of vapour in the tube. Vapour, or a mixture of vapour and air, is delivered vertically above the stirrer. For example EP 1 197 175 discloses a vapour pipe having a plurality of openings for incoming milk and air and at its outlet a stirrer for agitating the milk. DE 10 2004 063 285 discloses a similar device in which the vapour pipe is arranged for guiding only vapour and is impervious so as to avoid entry of milk into the tube for hygiene reasons. EP 1 597 992 discloses another such device of the same type. In WO 2007/095770 a lance with a Venturi arrangement is arranged to inject a steam-air mixture in a receptacle of milk. A similar arrangement is disclosed in WO 2007/144735.

A problem with such systems comes from the fact that the user has to properly hold the cup under the vapour pipe, or vice versa, so that the pipe's outlet does not emerge from the milk during the treatment which would lead to the projection of milk all over the place. This risk is even increased when such a vapour pipe cooperates with a stirrer located thereunder that can lead to the formation of a vortex in the milk nearby the stirrer and space the pipe's vapour outlet above the surface of the milk which can also lead to the projection of milk in addition to poor or non incorporation of vapour into the milk.

Moreover, the use of interdependent stirrers, vapour and/or air injection means, such as systems using a Venturi arrangement or systems having a stirrer driven by the injected vapour, have a very limited versatility. Normally, they allow only one mode of operation and require the user's skills, e.g. motion of the frothing arrangement and/or of the receptacle to adjust the frothing characteristics.

One solution to this latter problem has been proposed in EP 1 501 398 in which vapour is mixed with air in a ratio determined by the user and then injected as a mixture into a receptacle containing milk. The vapour-air ratio is adjusted with the view to heat the milk with a user-adjusted amount of froth. EP 1 776 905 discloses a similar system in which pulses of compressed air are incorporated into a flow of vapour and then injected as a mixture into a jug of milk. A further system of the same type is disclosed in U.S. Pat. No. 6,006,654 in which milk is pumped into a vapour stream and then mixed with air for frothing and then delivered at a discharge nozzle.

There is therefore still a need to provide a reliable system that is simple and reliable for producing frothed milk.

SUMMARY OF THE INVENTION

Therefore, the invention relates to an appliance for frothing a body of a milk-containing liquid contained in a frothing tank. The appliance comprises: an air incorporation device that is arranged to dip or to be immersed in said body of liquid during frothing for incorporating air thereinto; and a steam supply arrangement having a steam outlet that is arranged to be immersed in the body of liquid during frothing for incorporating steam thereinto.

In accordance with the invention, the steam outlet and the air incorporation device are arranged to be at spaced apart locations in this body of liquid during frothing so as to form steam bubbles at the steam outlet separately from air bubbles that are being formed by the air incorporation device.

The air bubbles introduced into the milk-containing liquid are thus distinct from steam bubbles formed at the steam outlet opening.

By separating the steam and the air incorporation into the milk-containing liquid, especially during the entire frothing process, the properties of the bubbles of steam and the bubbles of air are not modified before or at incorporation into the milk-containing liquid.

It has been found experimentally that the interaction of air bubbles and vapour bubbles upon incorporation into the milk-containing liquid, produces a higher froth quality than when air and vapour are mixed together before incorporation into the milk-containing liquid. Even though the physical and/or chemical phenomenons are not as yet well understood, and without being bound to any theory, it is believed that milk, in particular the conditioning of the milk proteins which is believed to influence directly the characteristics of the milk-containing foam, reacts differently when exposed to (especially substantially non-condensed) steam and air separately than when the milk-containing liquid is treated with a pre-mix of air and steam or, even worse, air and condensed steam, i.e. hot water.

The steam outlet may be associated with a valve means for controlling characteristics of the steam bubbles, in particular a bubble size thereof.

By adjusting the characteristics of the valve, in particular by regulating the flow of steam through the valve, the characteristics of the resulting frothed milk-containing liquid are influenced correspondingly, in particular the size of the pores in the frothed milk which depends on the size of the injected steam bubbles can be adjusted to reach a desired foam quality.

In particular, it has been found that injecting steam with a very fine bubble size into the milk-containing liquid, for instance by forcing the steam under pressure through a resilient valve member at the steam outlet opening, a foam quality close to the one obtained manually by the barista or highly skilled coffee sommelier, e.g. a foam with bubbles around approx. 150 micron, can be obtained, instead of a pore size at or above approx. 200 micron obtained with the known automatic milk frothers.

For instance, the valve means comprise a biased resilient member arranged to allow a release of steam through the outlet when such steam reaches a sufficient pressure in the steam supply arrangement. The resilient member is optionally associated with a user-adjustable bias means for adjusting the resilient member's bias. The valve means may include at least one of a lid, plug or cover resiliently closing the steam outlet opening.

The valve means may comprise a resilient section, in particular a tubular or conical section, for guiding such steam towards the steam outlet opening. This resilient section can be part of the steam outlet and the valve means may further comprise means for squeezing this resilient section to regulate the steam flow therethrough. Typically, the valve means further comprise a retaining surface, the resilient section being biased to urge the outlet opening against the retaining surface. In this case, a steam pressure may build up behind the valve to a level necessary to force the passage along the resilient section through the outlet opening and thus inject vapour bubbles with an adjusted size into the milk-containing liquid.

The appliance can also include a one-way valve or a non-return valve to prevent the introduction of the milk-containing liquid into the steam supply arrangement, in particular into its outlet. The valve for adjusting the bubble size may itself be a one-way valve or a non-return valve.

At delivery of such steam bubbles into this liquid, the outlet of the steam supply arrangement can have a section of up to 0.7 mm$^2$, typically in the range of 0.1 to 0.65 mm$^2$, in particular in the range of 0.2 to 0.55 mm$^2$ such as 0.25 to 0.45 mm$^2$.

The air incorporation device may comprise an air supply duct arranged to dip in the milk-containing liquid, in particular associated with an air pump, and/or an agitator, such as a stirrer.

Typically, the appliance of the invention has an operative position in which the steam outlet is located at a level below or at a side of the agitator. Hence, should the agitator such as a stirrer cause the formation in the milk-containing liquid of a vortex above the agitator, the steam outlet would still deliver steam into the milk-containing liquid and not above such a vortex.

In an embodiment of the invention, the appliance has a reservoir module with a frothing tank for containing the body of milk-containing liquid. The air incorporation device and the steam supply arrangement are optionally secured to the reservoir module. In particular, the air incorporation device can comprise a stirrer secured to a bottom of the frothing tank. The steam outlet can be located at or adjacent a bottom of the frothing tank.

Normally, the frothing tank has a central vertical axis, for example extending vertically from the centre of a generally circular or polygonal bottom face, the air incorporation device having an agitator in the tank off-centred relative to this vertical axis, whereby an asymmetric agitation can be generated in the body of milk-containing liquid. Alternatively or cumulatively, it is also possible to incorporate flow-perturbation obstacles in the structure of the tank, e.g. protrusion extending into the tank's cavity, so as to generate an asymmetric agitation. Optionally, the steam outlet is off-centred relative to this vertical axis and is in particular located opposite the agitator, whereby the location of the steam bubble formation and the location of the air bubble formation are separated in the tank.

Typically, the body of milk-containing liquid has a moving upper surface during frothing in the tank. To avoid dispensing of steam above the moving surface, the steam outlet should be so positioned in the frothing tank to be below this moving surface at all time during frothing. Optionally, the position of the steam outlet can be adjusted by the user for this purpose. The steam outlet may be associated with a safety valve for allowing the exit of steam via the outlet only when the outlet is located below the moving upper surface.

The steam arrangement may have a duct that is connectable to an external steam generator, in particular a steam generator of a hot beverage machine.

In an embodiment of the invention, the steam arrangement of the appliance includes a steam generator and a steam passage for guiding steam from the steam generator to the steam outlet. The steam generator may be located at a periphery and/or a bottom part of the reservoir module and may be giving into this steam passage. Such a passage may extend over a tank upright wall and down along the upright wall inside the frothing tank to the steam outlet. This upright wall is optionally associated with a movable cover member, for example hinged to the reservoir module and/or separable therefrom. Such a movable cover member may delimit a section of the steam passage for guiding steam over said upright wall and/or may give access to a water receptacle of the steam generator, in particular an access along the upright wall outside the tank.

The appliance may include a support base which is electrically connectable, e.g. to the mains, for powering the appliance. The reservoir module can be made separable from the support base in particular for cleaning the reservoir module or dispensing therefrom frothed milk-containing liquid. The support base may include at least one of a steam generator and a drive module for actuating an agitator in the frothing tank. Likewise, the reservoir module may have a cavity, typically adjacent the frothing tank, for containing at least one of a steam generator and a drive module for actuating an agitator in the frothing tank.

To increase the flexibility and user-adaptability, the appliance can be arranged to be user-configurable for incorporating air and steam simultaneously and/or sequentially while frothing the milk-containing liquid. The appliance may also be arranged to let the user choose the velocity of incorporation of air and/or steam into the milk-containing liquid. Optionally, the air incorporation means can be associated with a resistor heater for heating the milk-containing liquid in combination or without steam heating. Hence, a user may adjust the characteristics of the desired froth, in particular the fluidity and dryness thereof, as well as the foam structure by reducing or suppressing the steam incorporation and compensating the lack of steam heating by a resistor heating of the milk-containing liquid, for example a resistor assembled to a tank for containing the liquid or to the agitator.

Another aspect of the invention relates to an appliance, in particular of the type described above, having a reservoir module. Such a module comprises: a tank with a bottom part and at least one upright wall for containing a body of a milk-containing liquid which is to be heated and/or frothed therein. The module further incorporates a steam supply arrangement comprising a water receptacle and a water heater for producing steam adjacent to said tank and a passage for guiding the produced steam into the body of milk-containing liquid within the tank, such passage extending in particular over the tank's upright wall into the tank. Optionally, the module has a movable cover member on the tank's upright wall, the movable cover member delimiting a section of the steam passage for guiding steam over said upright wall and/or giving access to the water receptacle of the water heater.

The invention also relates to an appliance, in particular as described above. This appliance has a support base and a reservoir module that is separable from the support module and that is arranged for containing a body of a milk-containing liquid which is to be heated and/or frothed therein. The support base comprises: a steam generator with a water receptacle for producing steam adjacent to the reservoir module, the steam generator being associated with a steam passage for guiding the produced steam into said reservoir module; and a drive arrangement for driving an agitator, in particular magnetically driving the agitator, located in the reservoir module. The reservoir module and/or the support base is optionally assembled to a movable cover member that delimits a section of the steam passage and/or that gives access to the water receptacle.

Such appliances may incorporate any feature or combination of features described above.

BRIEF DESCRIPTION OF THE DRAWINGS

The invention will now be described with reference to the schematic drawings, wherein:

FIG. 2 illustrates a perspective view of another appliance according to the invention;

FIG. 3 shows a cross-sectional perspective view of the appliance of FIG. 2;

FIG. 4 shows an enlarged view of Detail X of FIG. 3;

FIG. 5 shows another appliance according to the invention; and

DETAILED DESCRIPTION

Figure 1:
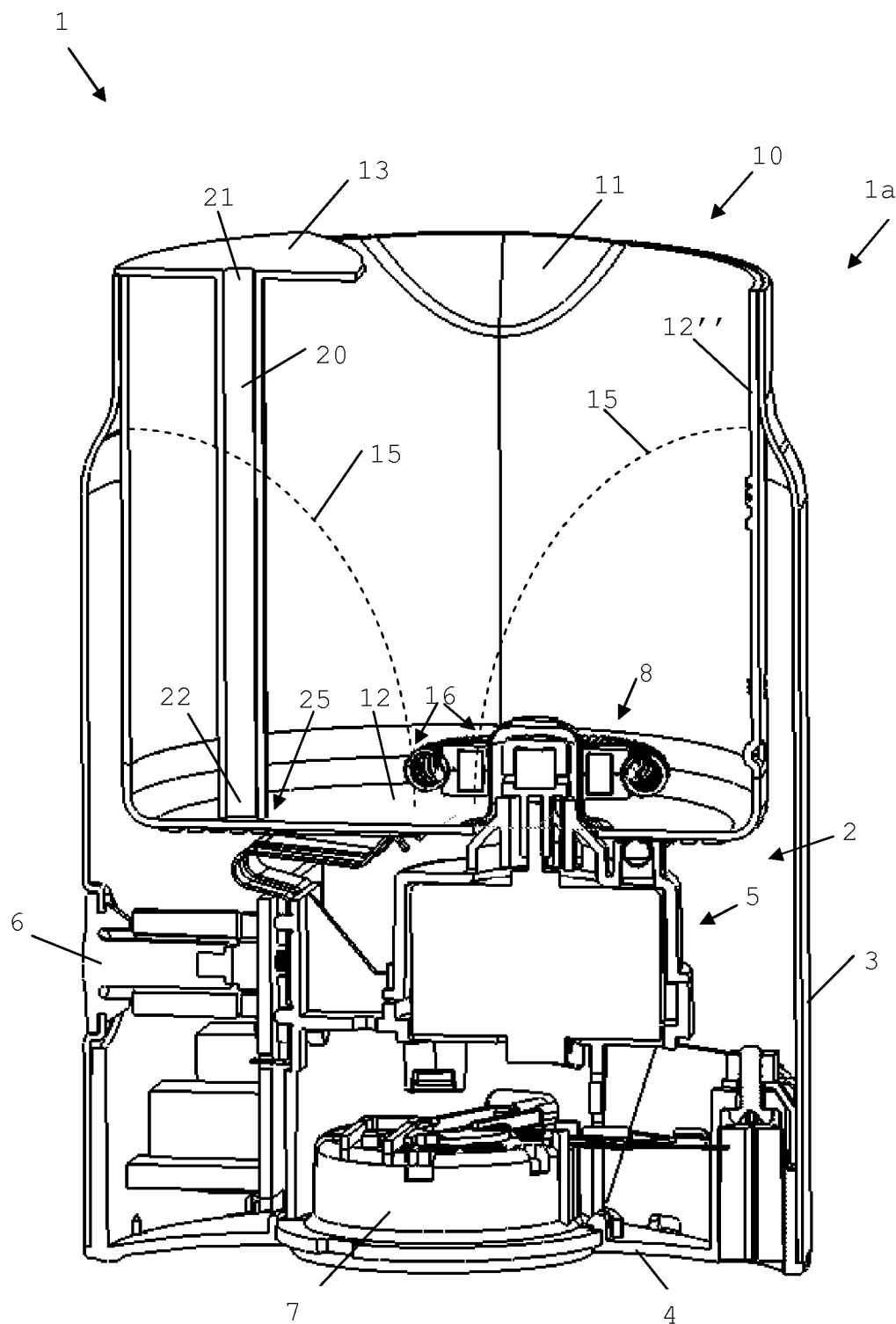
FIG. 1 shows a cross-sectional view of an appliance according to the invention.

As shown in FIG. 1, a reservoir module 1*a* of an appliance 1 according to the invention has a tank 10 for receiving the milk-containing liquid that is to be frothed. Reservoir module 1*a* is arranged to be removably electrically connected to a support base (not shown) via an electric power supply connector 7.

Tank 10 has a spout 11 for dispensing the liquid upon frothing. Furthermore, a closed compartment 2 is located under tank 10 that contains an electric drive arrangement 5 associated with a user-switch 6 and power supply connector 7 for connection to a support base (not shown). Drive arrangement 5 is arranged to drive a stirrer 8 that is located on a bottom 12 of tank 10 and that is magnetically coupled with drive arrangement 5 through bottom 12. Compartment 2 is formed by a generally tubular stand 3 assembled to a rigid bottom 4. The upper part of compartment 2 is delimited by tank 10 which is located inside and secured to stand 3. Thus, tubular stand 3, bottom 4 and tank 10 are three casing parts which, when assembled, form together chamber 2. Further details and variations on the appliance's structure, drive means, switches, electric connector and stirrer are for instance disclosed in WO2006/050900 and in WO/2008/142154, the contents of which are hereby incorporated by way of reference.

Moreover, appliance 1 has an arrangement for the supply of steam comprising a pipe 20 with an inlet 21 for connection to a steam generator (not shown) and an outlet 22 for delivering bubbles of steam at bottom 12 of tank 10. Pipe 20 is secured to tank 10 via a member 13 extending from the upper edge of tank 10.

Pipe 20 is made of resilient material, e.g. a plastic material, and urged under elastic constraint against bottom 12 so that pipe 20, which is compressed along its longitudinal direction, and bottom 12, which forms a retaining surface against the pipe's outlet 22. Longitudinally compressed pipe 20 and retaining surface 12 cooperate together to form a valve system for regulating the bubble size of steam bubbles exiting during use via an adjusted opening 25 formed by the periphery of steam outlet 22 urged against retaining surface 12 of tank 10. Hence, outlet opening 25 formed between tube 20 and bottom 12 has a section which is adjusted by the valve means, i.e. tube 20 biased against bottom 12, and the steam under pressure inside and along tube 20 forcing its way out via opening 25.

For operating appliance 1, steam inlet 21 is connected to a steam generator, in particular to the steam nozzle of a coffee machine via a steam connection tube (not shown), and milk or a milk-containing liquid is poured into tank 10.

Off-centred stirrer 8 is made to rotate in the liquid by switching on drive arrangement 5 by pushing button 6. The rotation of stirrer 8 leads to the formation of a vortex in the liquid contained in tank 10. This vortex, the surface of which is shown schematically in dotted lines 15, may extend down to and even below stirrer 8 at start-up. Consequently, air in the form of bubbles is mechanically incorporated into the liquid by the action of stirrer 8 rotating through the bottom part 16 of surface 15 of the agitated liquid.

Steam is produced by the steam generator and supplied via inlet 21 into pipe 20 and guided therealong to bottom 12. At outlet 22, the steam forces its way under pressure out through opening 25 to form very small steam bubbles in the rotating milk-containing liquid to heat the liquid and to form with the air bubbles a fine emulsion of milk-containing liquid, air and steam and condensed steam.

Moreover, at delivery of the steam bubbles into this liquid, the outlet opening 25 can have a section of about 0.3 or 0.4 to 0.5 or 0.6 mm$^2$.

In accordance with the invention, as illustrated in FIG. 1, steam outlet opening 25 and the air incorporation stirrer 8 are at spaced apart locations in the milk-containing liquid contained in tank 10 during frothing so as to form steam bubbles at steam outlet opening 25 separately from air bubbles that are being formed at stirrer 8.

FIGS. 2 to 4, in which the same numeric references generally designate the same or similar elements, illustrate a second embodiment of an appliance 1 according to the invention, which includes a steam generator 27,28.

Appliance 1 has a reservoir module 1a on a support base 1b, reservoir module 1a being separable from base 1b, e.g. for serving frothed liquid or cleaning. Reservoir module 1a includes a tank 10 having a bottom 12 located above a cavity 2 containing an electric drive arrangement 5 and a user-interface module 6. Reservoir module 1a is removably mounted on support base 1b with a connector arrangement 7 for transmitting electric power from the mains via an electric cable 71 to reservoir module 1a.

Reservoir module 1a of appliance 1 has an air incorporation device in the form of a stirrer 8 arranged to be immersed in a milk-containing liquid within tank 10. Stirrer 8 has an annular shape and is positioned around a protrusion 121 of tank bottom 12. Stirrer 8 is driven by drive arrangement 5 via a rotating magnetic transmission member 51 magnetically actuating stirrer 8 through bottom 12. Furthermore, reservoir module 1a includes a steam supply arrangement having: a steam generator in the form of a water receptacle 28 situated adjacent to tank 10 and a heater 27, in particular a resistive heater, located in or extending into reservoir 28 for heating and evaporating water contained in reservoir 28; and a passage 20,21,22,23,23',23",24 for guiding steam produced by the steam generator 27,28 to steam outlet opening 25 in tank 10.

In accordance with the invention, as apparent in FIGS. 3 and 4, steam outlet opening 25 and stirrer 8 are at spaced apart locations above bottom 12 of tank 10 and thus at spaced apart locations in the milk-containing liquid when tank 10 is filled therewith. Steam outlet 25 is located below and sufficiently spaced apart from air incorporator 8 so that the formation of steam bubbles and the formation of air bubbles in the milk-containing liquid are carried out separately therein. As explained above, entire separation of the processes of air incorporation and of steam incorporation leads to the improved froth quality.

Moreover, like in the previous embodiment of the invention shown in FIG. 1, pipe 20 is made of resilient material, e.g. a plastic material, and urged under elastic constraint against bottom 12 by means of support element 13 so that pipe 20, which is compressed along its longitudinal direction, and bottom 12, which forms a retaining surface against the pipe's outlet 22, cooperate together to form a valve system. This valve system being suitable to regulate the bubble size of steam bubbles exiting during use via opening 25. Indeed, outlet opening 25 formed between tube 20 and bottom 12 has a section which is adjusted by the valve means, i.e. tube 20 biased against bottom 12, and the steam under pressure inside and along tube 20 forcing its way out via opening 25.

It is possible to force pipe 20 through bore 13a of support element 13 such that pipe 20 may be slightly displaced downwards or upwards within support element 13. Hence, outlet 22 can be so positioned relatively to bottom 12 or urged thereagainst to adjust the desired bubble size of the steam bubbles exiting from outlet opening 25 formed between outlet 22 and bottom 12.

Moreover, to improve the stirring effect of stirrer 8 and the homogenisation of the milk-containing liquid within tank 10, stirrer 8 is located on bottom 12 off-centred relative to a central vertical axis 10'. Steam outlet 25 is also off-centred relative to vertical axis 10' and located opposite stirrer 8 on a peripheral part of tank 10.

Also shown in FIGS. 2 and 3, appliance 1 has a cover member 14 movably assembled via a hinge 14' to reservoir unit 1a along the top edge of the rear upright wall of water receptacle 28. Instead of being hingedly connected to the unit's structure, cover member may also be formed as a separable, freely removable cover member on the unit. Furthermore, cover member 14 partly covers tank 10 so that the inside of tank 10 remains visible for the user. In a variation, such cover member may extend over the entire mouth of tank 10, for instance to avoid any milk projections outside tank 10 during use; such a cover member may be partly or completely made of transparent or translucide material so that the user may still examine the content of tank 10 during use without having to uncover it.

Cover member 14 incorporates part of the steam supply arrangement, namely a steam collector 24 leading into a steam duct 23 formed in and along an inner protuberance 23a of cover member 14.

When cover member 14 is in its closed position, as shown in FIG. 2, its generally u-shaped peripheral front part is urged against rim 12' of the upright wall 12" of tank 12 and steam collector 24 is located immediately above water receptacle 28 for collecting the water evaporated therefrom by heater 27 and canalise this evaporated water into an inlet 23' of steam duct 23. Moreover, protuberance 23a is urged against support member 13 whereby outlet 23" is joined to inlet 21 of tube 20 via bore 13a of support member 13 so as to allow the passage of steam from duct 23 into pipe 20 and therefrom into a bottom part of tank 10 via opening 25.

When cover member 14 is turned open, as shown in FIG. 3, water receptacle 28 is uncovered and may be accessed by the user, for instance for refilling with water, emptying or even for cleaning or servicing.

Moreover, appliance 1 is fitted with a second resistor in thermal communication with tank 10, e.g. in the form of a thick-film heater 27' extending under bottom 12 of tank 10.

Second resistor 27' may be powered when a user wishes a frothed milk which has a lower water content, i.e. which is drier than when heated only by means of steam from the steam generator 27,28. When steam generator 27,28 is not activated, i.e. when heating is only carried out by second resistor 27', the froth obtained is of the same kind as with frothers of the type disclosed in WO2006/050900 and in WO/2008/142154.

It follows that appliance 1 shown in FIGS. 2 to 4 is arranged to be user-configurable for dry frothing or steam frothing or a combination of dry frothing and steam frothing.

Moreover, appliance 1 may be user-configurable so that air and steam are incorporated simultaneously or sequentially with or without dry heating via second resistor 27'. It is also possible to configure appliance 1 so that steam heating and heating with second resistor 27' are combined in order to accelerate the frothing.

Hence, appliance 1 gives the user the possibility to choose between dry and steam frothing depending on the heating used, i.e. steam and/or second resistor 27', and between small and large bubble frothing depending on the positioning of tube 20 over tank bottom 12.

In a variation, the same resistor heating may be used for dry and/or steam heating of the milk-containing liquid, for instance by allowing the user to bring this resistor in direct contact either with the tank or with the steam generator or with both at the same time.

Figure 6A:
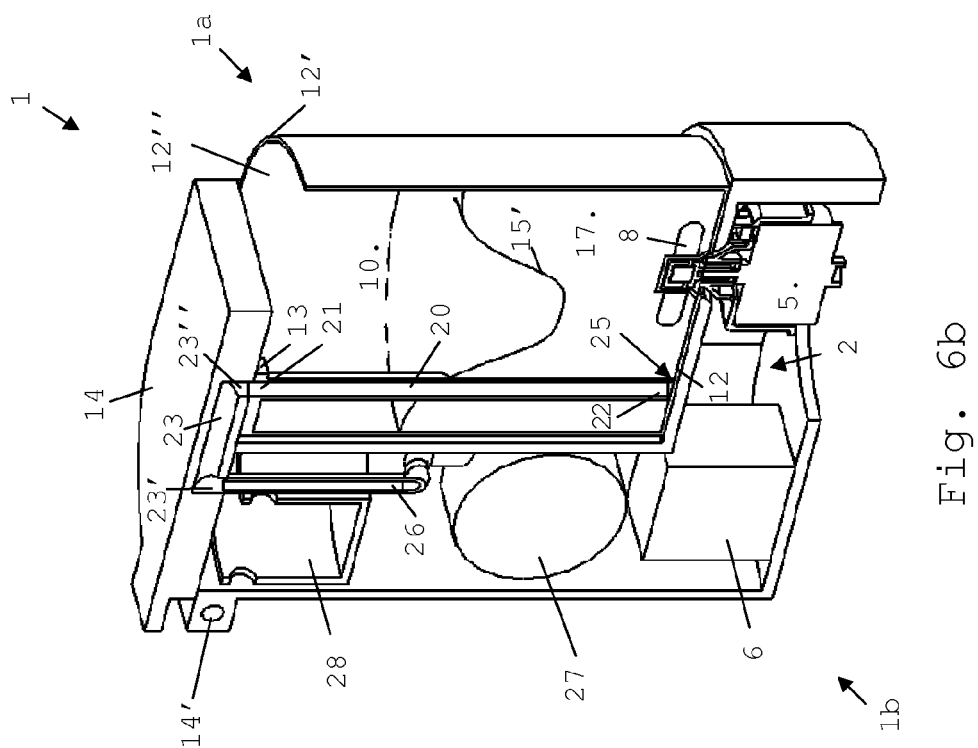
FIGS. 6*a* and 6*b* illustrate the appliance of FIG. 5 during operation.
Figure 6B:
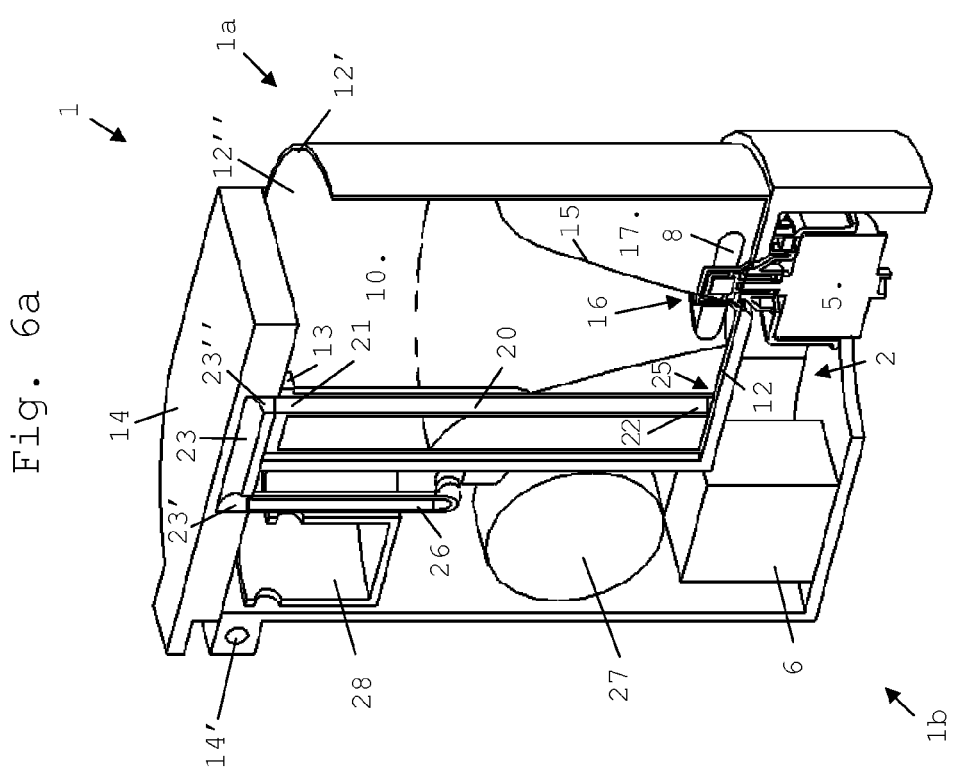

FIGS. 5, 6*a* and 6*b*, in which the same numeric references generally designate the same or similar elements, illustrate a further embodiment according to the invention of an appliance 1 for frothing a body of a milk-containing liquid 17 contained in a frothing tank 10.

In this embodiment, the reservoir module 1*a* does not include the steam generator or the drive arrangement. Steam generator 26,27,28, drive arrangement 5, user interface 6 and cover member 14 are incorporated into support base 1*b* which has a connection (not shown) to the mains.

Reservoir module 1*b* has a tank 10 which contains an agitator, for instance in the form of an off-centred stirrer 8, and a steam pipe 20 secured in a support element 13 with a bore 13*a*, like in the previous embodiment. Moreover, reservoir module 1*a* is separable from support base 1*b* and mountable thereon as indicated by arrow 1*ab* in FIG. 5.

Stirrer 8 is off-centred in tank 10 with respect to tank's vertical central axis 10'. Drive arrangement 5 is incorporated in support base 1*b* and has a rotatable magnetic transmission member 51 protruding through support surface 1*b'* for magnetically actuating stirrer 8 through a correspondingly shaped protrusion 121 in tank's bottom 12. Support surface 1*b'* and arched vertical face 1*b"* have a shape that matches bottom 12 of reservoir unit 1*b* and the reservoir's upright wall 12". Hence, transmission member 51 is as off-centred relatively to surface 1*b'* as stirrer 8 relatively to bottom 12. The location of transmission member 51 relatively to vertical face 1*b"* acts as a discriminator means for properly positioning and correct orientation of reservoir unit 1*a* on support base 1*b*. Hence, inlet 21 of pipe 20 secured to tank 10 automatically matches outlet 23" of duct 23 in cover member 14 of support base 1*b* when reservoir 1*a* is mounted onto base 1*b*.

Moreover, reservoir module 1*a* does not include any electric component and is not affected by any water or humidity infiltration. Hence, reservoir module 1*a*, or at least tank 10 when the remaining components of module 1*a* are separable therefrom, can be made of detergent-resistant material for permitting dishwasher cleaning.

FIG. 6*a* illustrates how appliance 1 of FIG. 5 operates at start-up. During operating, reservoir unit 1*a* is in place on support base 1*b* and cover member 14 is in its closed position over water receptacle 28 and part of the mouth of tank 10 against rim 12'.

Tank 10 contains a body of liquid 17, such as milk, at the beginning of the frothing process shortly after stirrer 8 has started to rotate in liquid 17. Stirrer 8 drives liquid body 17 to rotate and form a vortex in tank 10. Hence, liquid body 17 has a generally v-shaped surface 15 extending down to bottom 12. At this period of time, stirrer 8 rotates through surface 15 at level 16 and thereby incorporates air in the form of bubbles into liquid 17.

Simultaneously, water is passed from water tank 28 into in-line heater 27 where it is evaporated and guided as steam via pipe 26 through duct 23 and pipe 20 into milk body 17, thereby forming therein steam bubbles at outlet opening 25 and heating the milk 17. Upon formation, steam bubbles and air bubbles that are formed and incorporated at different locations in tank 10, may combine to form a foamy milk-containing phase in body 17.

The more air and steam is incorporated into body 17, the foamier body 17 becomes and increases in volume and viscosity.

As shown in FIG. 6*b*, after a certain period of frothing time, the heated milk body 17 is so emulsified by steam and air that its surface 15' generally forms a v-shape extending only about half-way down body of milk 17. At this stage, stirrer does not anymore extend through body surface 15' and hence no further air incorporation takes place at the level of stirrer 8. A limited amount of air may only be incorporated at surface 15' at a low rate by the result of agitation. In a variation, it is also possible to incorporate air and steam in a time overlap and/or sequentially.

As illustrated in FIGS. 6*a* and 6*b*, steam outlet 25 is at all time located within milk body 17 underneath moving surface 15,15' so that steam is incorporated into milk body 17 and not thereabove. Hence projections of hot liquids are prevented.

What is claimed is:

1. An appliance for frothing a body of a milk-containing liquid contained in a frothing tank, comprising:
    an air incorporation device that is arranged to dip or to be immersed in the body of liquid during frothing for incorporating air thereinto; and
    a steam supply arrangement having a steam outlet that is arranged to be immersed in the body of liquid during frothing for incorporating steam thereinto,
    wherein the steam outlet and the air incorporation device are arranged with sufficient spacing between them in the body of liquid during frothing to allow steam bubbles to form at the steam outlet separately from air bubbles formed by the air incorporation device, and to avoid mixing the steam and air before incorporation into the milk containing liquid.

2. The appliance of claim 1, wherein the steam outlet is associated with valve means for controlling characteristics of or delivery into the liquid of the steam bubbles, wherein at such delivery, the steam outlet has an opening that has a cross-section of up to 0.7 mm$^2$.

3. The appliance of claim 1, wherein the valve means is a one-way or non-return valve and the characteristics of the steam bubbles that are controlled include bubble size, with the steam outlet cross-section having a size of 0.1 to 0.65 mm$^2$, 0.2 to 0.55 mm$^2$ or 0.25 to 0.45 mm$^2$.

4. The appliance of claim 1, wherein the air incorporation device comprises an agitator or a stirrer.

5. The appliance of claim 4, which has an operative position in which the steam outlet is located below or at a side of the agitator or stirrer.

6. The appliance of claim 1, which is associated with a reservoir module that has a frothing tank for containing the body of liquid, with either or both of the air incorporation device and the steam supply arrangement being optionally secured to the reservoir module.

7. The appliance of claim 6, wherein the air incorporation device comprises a stirrer secured to a bottom of the frothing tank and the steam outlet is located at or adjacent the bottom of the frothing tank.

8. The appliance of claim 6, wherein the frothing tank has a central vertical axis, the air incorporation device has an agitator in the tank off-centered relative to the vertical axis, and the steam outlet is optionally off-centered relative to the vertical axis and agitator.

9. The appliance of claim 6, wherein the frothing tank is arranged to contain during frothing the body of liquid with a moving upper surface, and wherein:
 the steam outlet is positioned in the frothing tank below the moving surface at all time during frothing, with the steam outlet optionally having a position that is user-adjustable so that the position of the outlet is below the surface; or
 the steam outlet is associated with a safety valve for allowing the exit of steam via the outlet only when the outlet is located below the moving upper surface.

10. The appliance of claim 6, wherein the steam arrangement comprises a duct that is connectable to an external steam generator, with the steam generator optionally associated with a hot beverage machine.

11. The appliance of claim 10, wherein the steam arrangement comprises a steam generator and a steam passage for guiding steam from the steam generator to the steam outlet, the steam generator being located at a periphery or bottom part of the reservoir module and giving into the steam passage that extends over a tank upright wall and down along the upright wall inside the frothing tank to the steam outlet, the upright wall optionally being associated with a movable cover member that delimits a section of the steam passage for guiding steam over the upright wall or that gives access to a water receptacle of the steam generator.

12. The appliance of claim 6, further comprising a support base which is electrically connectable for powering the appliance, the reservoir module being separable from the support base for cleaning the reservoir module or dispensing therefrom frothed milk-containing liquid.

13. The appliance of claim 12, wherein:
 the support base comprises at least one of a steam generator and a drive module for actuating an agitator in the frothing tank; or
 the reservoir module has a cavity for containing at least one of a steam generator and a drive module for actuating an agitator in the frothing tank.

14. The appliance of claim 6, which is arranged to be user-configurable for incorporating air and steam simultaneously or sequentially during a frothing of the body of liquid, with the air incorporation device being optionally associated with a resistor heater for heating the body of liquid.

15. An appliance for frothing a body of a milk-containing liquid contained in a frothing tank, comprising:
 a reservoir module comprising:
  a tank having a bottom part and at least one upright wall for containing a body of a milk-containing liquid which is to be heated or frothed therein; and
  a steam supply arrangement comprising a water receptacle and a water heater for producing steam adjacent to the tank and a passage for guiding the produced steam into the body of liquid within the tank, the passage extending over the upright wall into the tank; and optionally a movable cover member on the upright wall that delimits a section of the steam passage for guiding steam over the upright wall or that provides access to the water receptacle;
 an air incorporation device that includes an agitator or stirrer and that is arranged to dip or to be immersed in the body of liquid held in the tank of the reservoir module during frothing for incorporating air thereinto; and
 a steam supply arrangement having a steam outlet that is arranged to be immersed in the body of liquid in the tank during frothing for incorporating steam thereinto,
 wherein the steam outlet and the air incorporation device are arranged such that there is sufficient spacing between them in the body of liquid during frothing to allow steam bubbles to form at the steam outlet separately from air bubbles formed by the air incorporation device, and to avoid mixing of the steam and air before incorporation into the milk containing liquid.

16. The appliance of claim 15, wherein the steam outlet is associated with valve means for controlling characteristics of or delivery into the liquid of the steam bubbles, wherein at such delivery, the steam outlet has an opening that has a cross-section of up to 0.7 mm$^2$.

17. An appliance for frothing a body of a milk-containing liquid contained in a frothing tank, comprising:
 a support base and reservoir module that is separable from the support base and that is arranged for containing a body of a milk-containing liquid which is to be heated or frothed therein, wherein the support base comprises:
  a steam generator with a water receptacle for producing steam adjacent to the reservoir module, the steam generator being associated with a steam passage for guiding the produced steam into the reservoir module; and
  a drive arrangement for driving an agitator located in the reservoir module;
 an air incorporation device that is arranged to dip or to be immersed in the body of liquid held in the reservoir module during frothing for incorporating air thereinto; and
 a steam supply arrangement having a steam outlet that is arranged to be immersed in the body of liquid in the reservoir module during frothing for incorporating steam thereinto,
 wherein the steam outlet and the air incorporation device are arranged such that there is sufficient horizontal spacing between them in the body of liquid during frothing to allow steam bubbles to form at the steam outlet separately from air bubbles formed by the air incorporation device, and to avoid mixing the steam and air before incorporation into the milk containing liquid; and
 wherein the appliance is arranged to be user-configurable for incorporating air and steam simultaneously or sequentially during frothing of the body of liquid.

18. The appliance of claim 17, wherein the reservoir module or the support base is assembled to a movable cover member that delimits a section of the steam passage or that gives access to the water receptacle.

19. The appliance of claim 18, wherein the drive arrangement includes means for magnetically driving the agitator.

20. The appliance of claim 18, wherein the steam outlet is associated with valve means for controlling characteristics of or delivery into the liquid of the steam bubbles, wherein at such delivery, the steam outlet has an opening that has a cross-section of up to 0.7 mm$^2$.

\* \* \* \* \*